(12) United States Patent
Shin et al.

(10) Patent No.: US 8,457,150 B2
(45) Date of Patent: Jun. 4, 2013

(54) METHOD AND APPARATUS FOR NOTIFYING STATUS OF MOBILE NODE IN A WIRELESS LOCAL AREA NETWORK SYSTEM USING VISIBLE LIGHT COMMUNICATION

(75) Inventors: Hong-Seok Shin, Suwon-si (KR); Dong-Ho Cho, Seoul (KR); Hyu-Dae Kim, Daejeon (KR); Chi-Sung Bae, Daejeon (KR); Soo-Yong Jeon, Daejeon (KR); Woo-Chan Kim, Daejeon (KR); Sung-Yeop Pyun, Daejeon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 860 days.

(21) Appl. No.: 12/175,683

(22) Filed: Jul. 18, 2008

(65) Prior Publication Data

US 2009/0022112 A1 Jan. 22, 2009

(30) Foreign Application Priority Data

Jul. 20, 2007 (KR) ........................ 10-2007-0072791

(51) Int. Cl.
*H04L 12/43* (2006.01)
*H04W 4/00* (2009.01)

(52) U.S. Cl.
USPC .......................................... 370/458; 370/338

(58) Field of Classification Search
USPC .............. 370/229, 230, 230.1, 231, 232, 235, 370/236, 252, 328, 329, 336, 337, 431, 458, 370/437, 461
See application file for complete search history.

(56) References Cited

U.S. PATENT DOCUMENTS

| 7,668,253 | B2 * | 2/2010 | Hwang et al. | 375/295 |
| 7,830,834 | B2 * | 11/2010 | Das et al. | 370/329 |
| 2003/0067900 | A1 * | 4/2003 | Pittock | 370/336 |
| 2007/0008889 | A1 * | 1/2007 | Seo | 370/232 |
| 2008/0131140 | A1 * | 6/2008 | Shin et al. | 398/172 |
| 2009/0310971 | A1 * | 12/2009 | Kim et al. | 398/103 |
| 2011/0064405 | A1 * | 3/2011 | Rajagopal et al. | 398/43 |

* cited by examiner

*Primary Examiner* — Michael Thier
*Assistant Examiner* — Feben M Haile
(74) *Attorney, Agent, or Firm* — Cha & Reiter, LLC (57) ABSTRACT

A method and apparatus for notifying status of an MN in a WLAN system using VLC are provided, in which an AP allocates a first predetermined number of time slots per frame as unallocated slots, for status notification of an initially accessing MN and allocates a second predetermined number of time slots per frame as reserved slots, for status notification of an initially accessing MN and uplink data transmission of an MN, and the MN transmits a visible light signal carrying status information about the MN in one of an unallocated slot and a reserved slot, if the MN initially accesses the AP.

18 Claims, 6 Drawing Sheets

METHOD AND APPARATUS FOR NOTIFYING STATUS OF MOBILE NODE IN A WIRELESS LOCAL AREA NETWORK SYSTEM USING VISIBLE LIGHT COMMUNICATION

CLAIM OF PRIORITY

This application claims the benefit of the earlier filing date, under 35 U.S.C. §119(a), of that Korean Patent Application filed in the Korean Intellectual Property Office on Jul. 20, 2007 and assigned Serial No. 2007-72791, the entire disclosure of which is hereby incorporated by reference.

BACKGROUND OF THE INVENTION

The present invention generally relates to a Visible Light Communication (VLC) system. More particularly, the present invention relates to a method and apparatus for transmitting status information about a Mobile Node (MN) in a Wireless Local Area Network (WLAN) system using VLC.

The Korean Agency for Technology and Standards (KATS) announced that traditional lighting would be replaced by Light Emitting Diode (LED) lighting by 2015. Due to their high luminous efficiency and low price, LEDs are gaining popularity in general illumination applications that had been dominated by fluorescence and incandescence. In addition LEDs are continually being used in special illumination applications such as portable devices, cars, displays, traffic signals, and advertising boards. White LEDs especially outperform incandescence in luminous efficiency and some white LED products outperform fluorescence light. Also, Radio Frequency (RF) exhaustion, probable incompatibility between wireless communication technologies, increasing communication security requirements, and the advent of an ultra high-speed ubiquitous communication environment of $4^{th}$ Generation (4G) wireless technology are driving forces behind the recent increasing interest in visible light wireless communication technology that is mutually complementary to RF technology. Therefore, many companies and research institutes are conducting studies on visible light wireless communications using visible light LEDs.

While traditional fluorescent or incandescent lighting will be replaced by LED lighting with good performance and long lifetime in households, offices, and public places, a LED light can also be used as a communication light source by modulating a current applied to the LED. That is, broadcasting and data transmission are enabled with the LED light without an additional light source. A terminal user or a laptop user can make WLAN data communication using a visible light wireless transceiver module under LED lighting.

Visible light wireless communications are different from other wireless RF communications mainly in that data transmission and reception is visible to the user. That is, the user can easily locate visible light transceiver modules and can confirm a communication path. Based on these features, the user can establish a communication path between a transmitter and a receiver, while visibly locating visible light transceiver modules.

In real VLC, light sources other than a transmitting terminal and a receiving terminal may exist and visible lights from the light sources may be received at a visible light receiver of an Access Point (AP). In this case, there is a possibility that a plurality of mobile nodes may attempt access simultaneously; thus causing a collision. The collision leads to access delay and resource consumption. In this situation, communications could start according to a call setup procedure involving an initial access procedure that minimizes collisions and reduces resource consumption, rather than communications just starting when a visible light signal is incident upon the Access Point. Also, when a mobile node attempts an initial access, it should not interfere with communication signals from other mobile nodes.

SUMMARY OF THE INVENTION

An aspect of exemplary embodiments of the present invention is to address at least the problems and/or disadvantages described above and to provide at least the advantages described below. Accordingly, an aspect of exemplary embodiments of the present invention is to provide a method and apparatus for transmitting status information about a mobile node in a WLAN system using VLC.

In accordance with an aspect of exemplary embodiments of the present invention, there is provided a method for notifying status of a mobile node in a WLAN system using VLC, in which an AP allocates a first predetermined number of time slots per frame as unallocated slots, for status notification of an initially accessing MN and allocates a second predetermined number of time slots per frame as reserved slots, for status notification of an initially accessing MN and uplink data transmission of an MN, and if the MN initially accesses the AP, the MN transmits a visible light signal carrying status information about the MN in one of an unallocated slot and a reserved slot.

In accordance with another aspect of exemplary embodiments of the present invention, there is provided an apparatus for notifying status of a mobile node in a WLAN system using VLC, in which an AP allocates a first predetermined number of time unallocated slots per frame for status notification of an initially accessing MN and allocates a second predetermined number of reserved time slots per frame for status notification of an initially accessing MN and uplink data transmission of an MN, and an MN transmits a visible light signal carrying status information about the MN in one of an unallocated slot and a reserved slot, when the MN initially accesses the AP.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF THE INVENTION

The matters presented in the description, such as a detailed construction and elements, are provided to assist in a understanding of exemplary embodiments of the invention. Accordingly, those of ordinary skill in the art will recognize that various changes and modifications of the embodiments of the invention described herein can be made without departing from the scope and spirit of the invention. Also, descriptions of well-known functions and constructions are omitted for clarity and conciseness.

Figure 1:
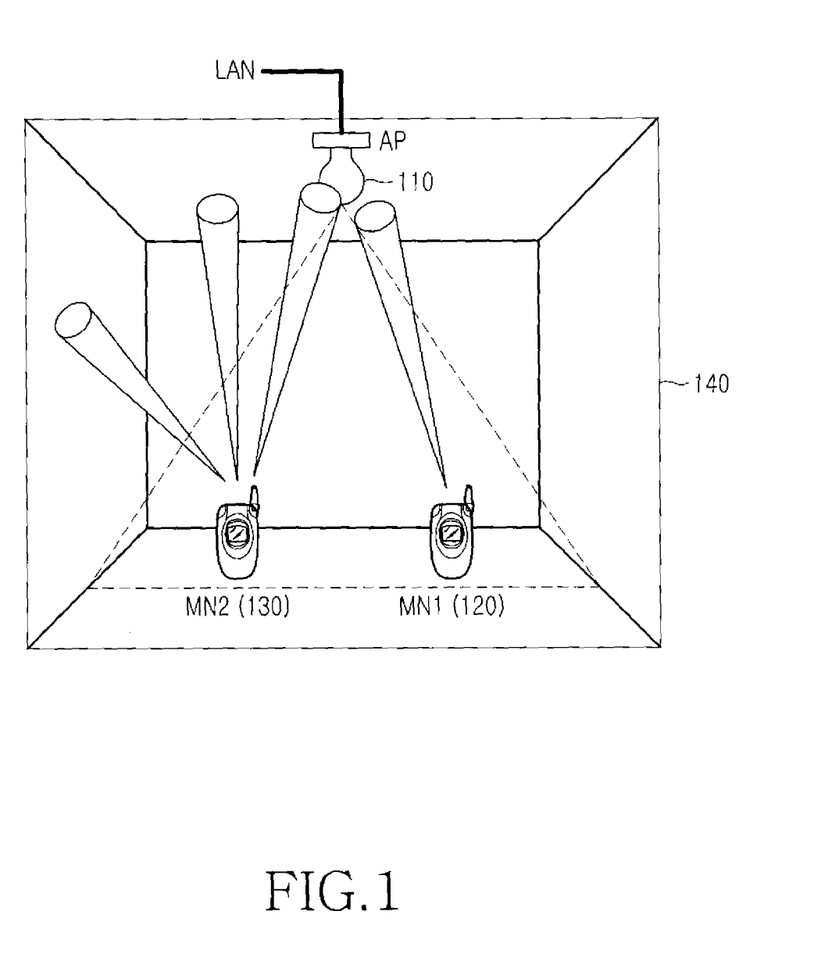
FIG. 1 illustrates a WLAN system using VLC to which the present invention is applied.

FIG. 1 illustrates a WLAN system using VLC to which the present invention is applied.

Referring to FIG. 1, the WLAN system using VLC includes an AP 110 and first and second mobile nodes (MN) 120 and 130 (MN1 and MN2). The AP 110 serves as a light receiver/transmitter and, at the same time, is connected to a wired Local Area Network (LAN). The AP 110 services service area 140 and wirelessly communicates with MN1 and MN2 within the service area 140 by visible light. MN1 and MN2 are mobile and wirelessly communicate with the AP 110 within area 140 where they are located, using visible light as a communication medium.

Due to the use of visible light as a communication medium in the WLAN system using VLC, a user can view light beam carrier signal carrying data transmission and reception and also visibly confirm communication whether the light beam is being intercepted. Also, because of the distances involved in VLC, the communications can be implemented with low power. Therefore, the user can easily locate a transmitter and a receiver and visibly confirm a communication path.

Figure 2:
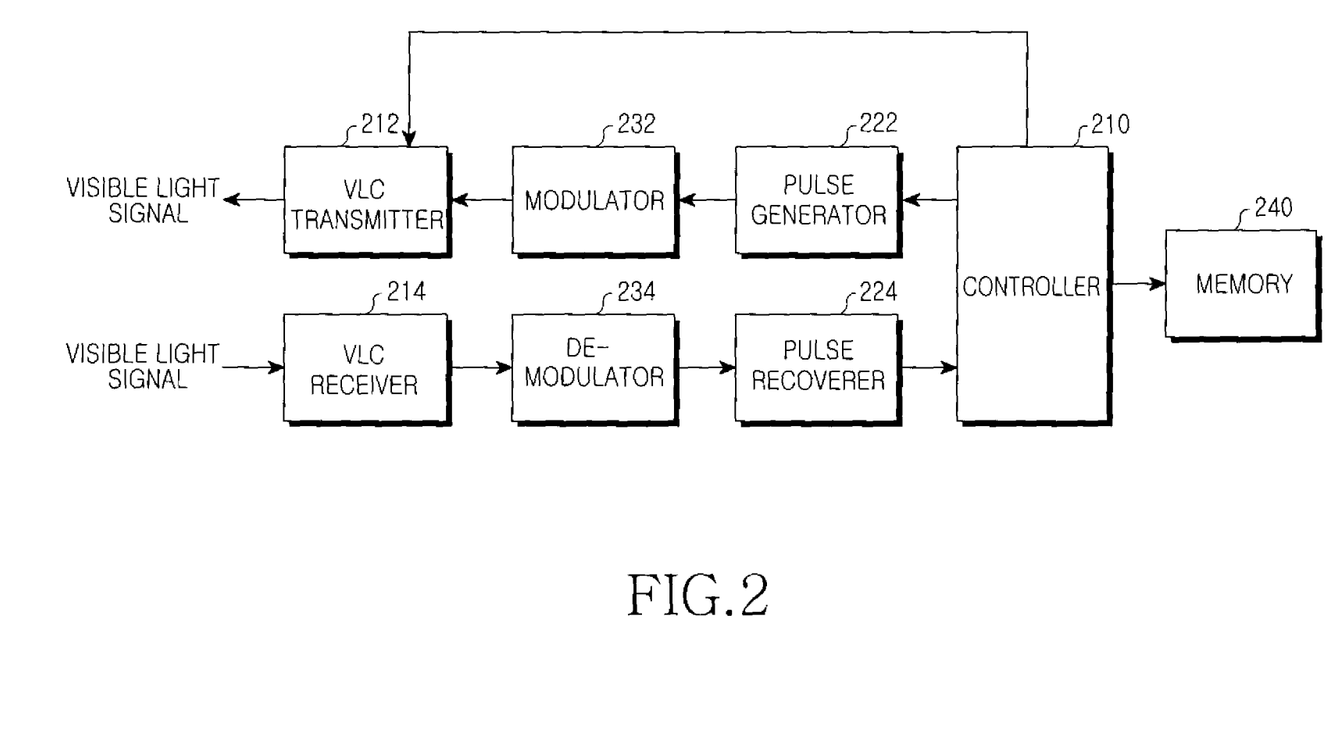
FIG. 2 is a block diagram of a VLC transceiver according to an exemplary embodiment of the present invention.

FIG. 2 is a block diagram of a VLC transceiver according to an exemplary embodiment of the present invention.

Referring to FIG. 2, a VLC transceiver 200 according to an exemplary embodiment of the present invention includes a controller 210, a VLC transmitter 212, a VLC receiver 214, a pulse generator 222, a pulse recoverer 224, a modulator 232, and a demodulator 234.

The controller 210 provides overall control to the VLC transceiver 200 and stores data received by VLC in a memory 240. According to the present invention, if the VLC transceiver 200 resides in an MN, the controller 210 controls the flickering cycle of a visible light signal so that the MN can transmit its status information during an initial access to AP 110 (FIG. 1).

The pulse generator 222 generates a pulse signal corresponding to transmission data under the control of the controller 210.

The modulator 232 modulates the pulse signal received from the pulse generator 222 to a signal suitable for VLC and provides it to the VLC transmitter 212.

The VLC transmitter 212 transmits a visible light signal corresponding to the modulated signal under the control of the controller 210. The VLC transmitter 212 can be configured with a Laser Diode (LD), an LED, or an LD or LED array as a light source.

The VLC receiver 214 converts an input visible light signal to an electrical signal. The VLC receiver 214 can be configured with a photo diode for converting incident external light to an electrical signal.

The demodulator 234 demodulates the electrical signal to a pulse signal. The pulse recoverer 224 recovers data from the pulse signal and provides the data to the controller 210.

With reference to FIG. 2, transmission and reception operations of the VLC transceiver 200 according to the exemplary embodiment of the present invention will be described.

For transmission from the VLC transceiver 200, the pulse generator 222 generates a pulse signal corresponding to transmission data under the control of the controller 210, the modulator 232 modulates the pulse signal to a signal suitable for VLC, and the VLC transmitter 212 transmits a visible light signal corresponding to the modulated signal.

For reception in the VLC transceiver 200, the VLC receiver 214 configured with a photo diode receives a visible light signal and converts the visible light signal to an electrical signal under the control of the controller 210. The demodulator 234 demodulates the electrical signal to a pulse signal. The pulse recoverer 224 recovers data from the pulse signal and provides the data to the controller 210.

As described before, the VLC system is characterized by visible awareness of a transmitted signal. For example, if the VLC transceiver of an MN continuously emits light in the service area 140 using VLC illustrated in FIG. 1, the direction of an uplink visible light signal is visible to a user. Based on this feature, the user can control the VLC transceiver of the MN so that the visible light signal can be steered toward the VLC transceiver of the AP 110.

In addition, additional information can be transmitted by changing the flickering cycle of a visible light signal according to the present invention.

Figure 3A:
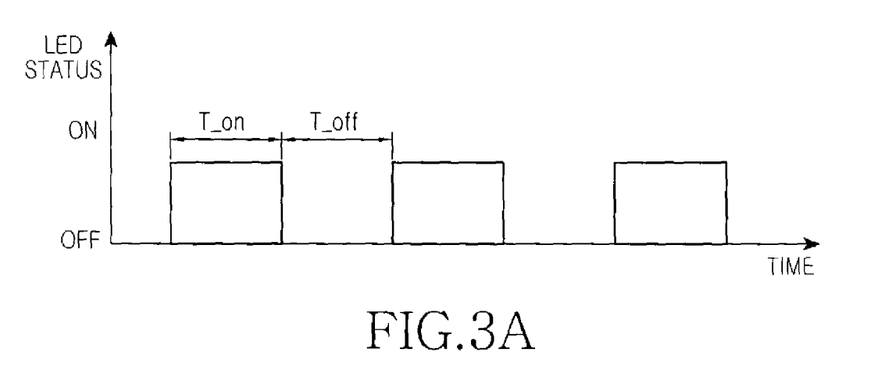
FIGS. 3A, 3B and 3C are views illustrating flickering cycles for representing status information about an MN in the WLAN system using VLC according to an exemplary embodiment of the present invention.
Figure 3B:
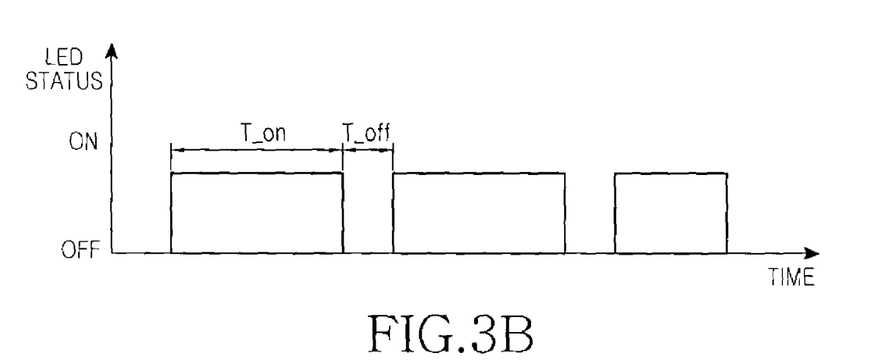
Figure 3C:
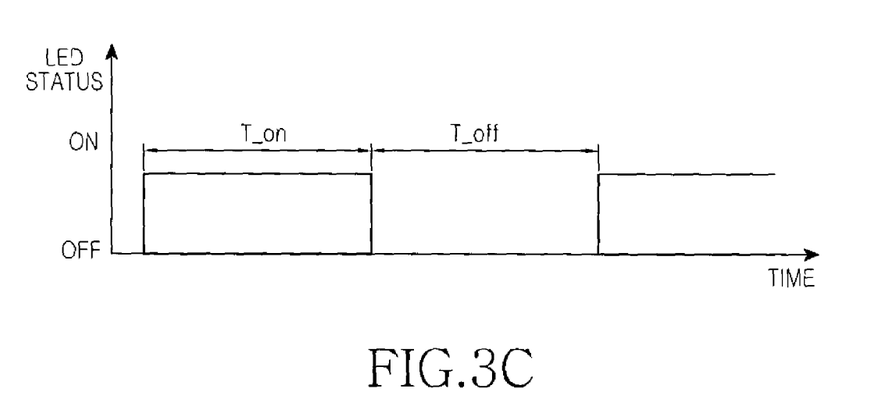

FIGS. 3A, 3B and 3C are views illustrating flickering cycles for representing status information about a mobile node in the WLAN system using VLC according to an exemplary embodiment of the present invention. In FIGS. 3A, 3B and 3C, a plurality of ON-OFF patterns are illustrated. A visible light signal is generated during an ON period, whereas it is not generated during an OFF period. Various ON-OFF patterns can be produced by changing an ON-period length, an OFF-period length, or an ON-OFF cycle (i.e. flickering cycle). The flickering may be detectable or observable to the human eye when the rate of change is within a perceivable visible range, e.g., on/off at a 1 second rate. The status of each of the mobile nodes in the service area 140 is mapped to predetermined ON-OFF patterns and status information about the MN is transmitted in an ON-OFF pattern corresponding to the status information.

Referring to FIGS. 3A, 3B and 3C, T_ON represents an ON-period length and T_OFF represents an OFF-period length. T_ON+T_OFF is the flickering cycle of a visible light signal.

As illustrated in FIGS. 3A and 3B, status information can be transmitted by changing T_ON+T_OFF, i.e. an LED flickering rate (i.e. cycle) according to the present invention. Hence, the status of the MN is indicated based on T_ON+T_OFF. As illustrated in FIG. 3B, status information can be transmitted by changing the ratio of T_ON to the same total cycle (T_ON/T_ON+T_OFF).

A visible pattern can be created by appropriately controlling T_ON and T_OFF in a predetermined pattern and predetermined MN statuses are mapped to various visibly different patterns. Thus, status information about the MN can be transmitted by generating a visible tight signal in a pattern corresponding to the status of the MN.

For example, MN status that can be represented in the above scheme may include the status of no reception from the access point, the status of acquiring downlink synchronization to the AP, the status of awaiting a response for an access request to the AP, the status of failing regarding the access request to the AP, and the status of successful access to the AP. Although five different status conditions are presented as examples it would be recognized that the number of different status conditions may be increased or decreased without altering the scope of the invention as such alteration would be within the knowledge of those skilled in the art.

In a WLAN system using VLC according to the exemplary embodiment of the present invention, the mobile node can transmit data only in resources allocated to it. To implement the above status information transmission method, T_ON should be sufficiently long in FIGS. 3A, 3B and 3C. However, since a plurality of MNs operate in the WLAN system and they transmit data to the AP on their uplinks, the MN is not allowed to continue generating a visible light signal for a long time.

In general, repeated light flickering on and off at a very high rate is not detectable to the human eye. Hence, the user thinks that light is being kept "on." A fluorescent bulb is an example of a flickering light that is perceived as being constantly on. Thus the visible light includes an "on" period that is visible and an "off" period this is also visible. This visible "off" period is achieved because of the slower response to of the user's eyes to the on/off cycle.

Figure 4A:
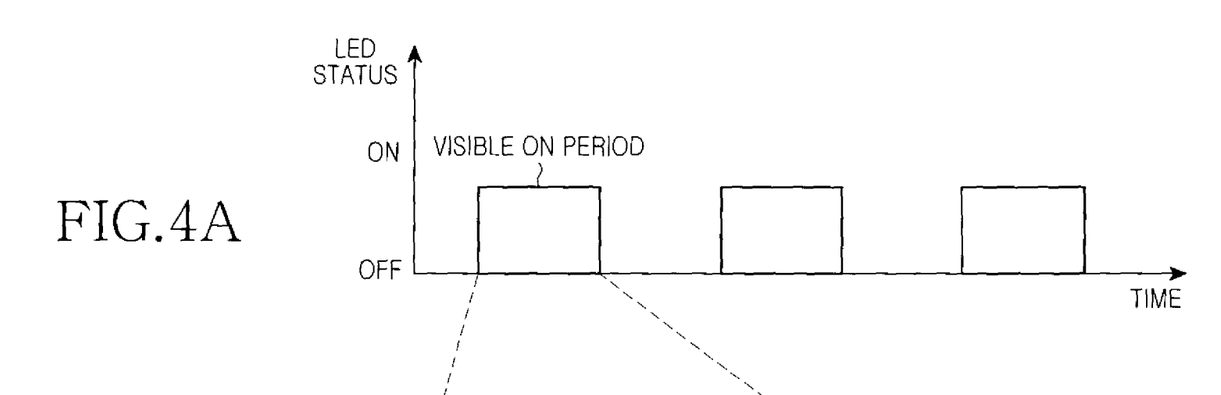
FIGS. 4A and 4B illustrate an ON period in the WLAN system using VLC according to an exemplary embodiment of the present invention.
Figure 4B:
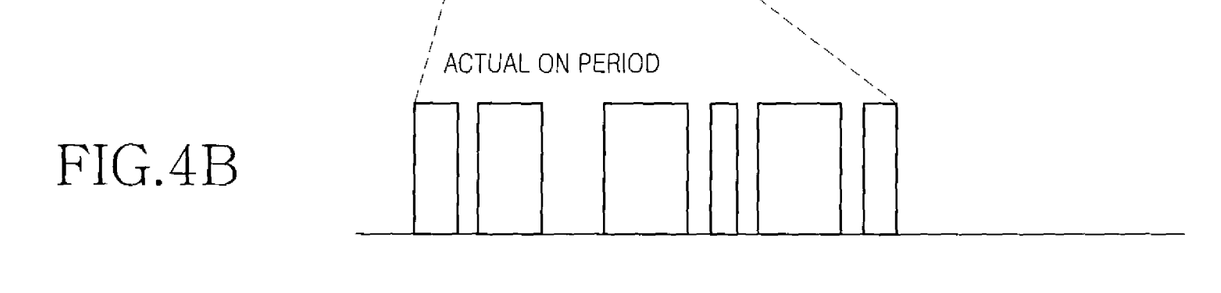

FIGS. 4A and 4B illustrate an exemplary ON period in the WLAN system using VLC according to an exemplary embodiment of the present invention. FIG. 4A illustrates an ON period detectable to the human eye that is composed of periods of a visible light signal that flickers on and off at a visibly undetectable rate, as illustrated in FIG. 4B.

Only when an LED is actually on for long enough, the human eye views the LED as being in an "on" state. That is, if an actual "on" state is sufficiently long relative to an actual "off" state in FIGS. 4A and 4B, the user will perceive the LED as being maintained in an "on" state. On the other hand, if the actual "on" state is shorter than the actual "off" state, the user will perceive the LED as being in an "off." Accordingly, the LED should be turned on long enough to make the user perceive a visible light signal.

When the mobile node attempts an initial access to the AP, the amount of transmission data from the MN is so small that the ratio of the ON period to the OFF period of the LED of the MN is very low. Therefore, the LED appears to be off to the user. This means that a visible light signal needs to be generated further to make the user perceive the visible light signal. Hence, the MN uses the afore-described MN status information transmission method such that the visible light signal is visible to the user.

Because the MN's transmission of a visible light signal in time slots allocated for uplink data transmission interferes with data transmission from other MNs, it acquires resource allocation information by analyzing a signal received from the AP and transmits the visible light signal in time slots remaining unallocated for uplink data transmission. As a consequence, the MN can notify its status during the initial access without interfering with uplink data transmission from other MNs.

Figure 5:
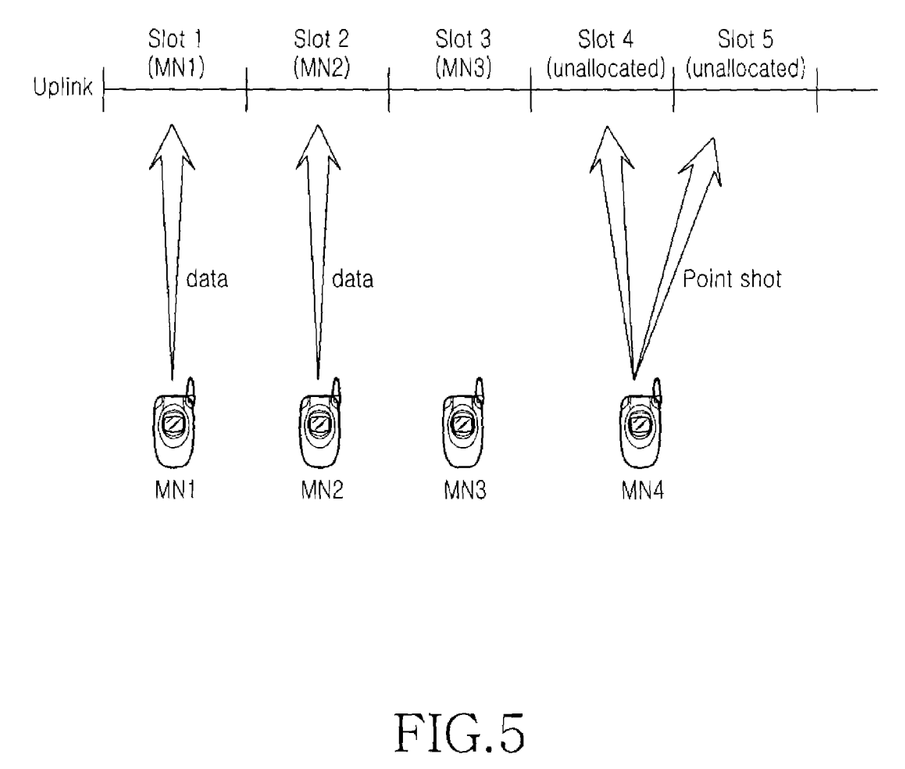
FIG. 5 illustrates a method for transmitting a status information signal in an unallocated slot from an MN in the WLAN system using VLC according to an exemplary embodiment of the present invention.

FIG. 5 illustrates a method for transmitting a status information signal in an unallocated slot from an MN in the WLAN system using VLC according to an exemplary embodiment of the present invention.

Referring to FIG. 5, first, second and third time slots (Slot 1, Slot 2 and Slot 3) are already allocated to first, second and third MNs (MN1, MN2 and MN3), for uplink data transmission and fourth and fifth time slots (Slot 4 and Slot 5) remain unallocated. During an initial access, a fourth MN (MN4) can transmit a visible light signal carrying its status information in Slot 4 and Slot 5.

To render the above unallocated slot using method to be effective, there should be a sufficient number of unallocated time slots. If time slots are mostly used for uplink data transmission, MNs cannot notify their statuses during an initial access. Therefore, the AP provides a predetermined number of time slots for access information and not uplink data transmission. Since the AP is not aware when the MNs initially access the AP, the AP keeps some time slots unallocated. In accordance with an exemplary embodiment of the present invention, the AP keeps two of five time slots per frame unallocated, as illustrated in FIG. 5. In this case, although they are available for uplink data transmission from other MNs, the time slots are left unallocated. Hence, in the case of large uplink traffic, throughput is decreased.

When an MN requests resources for uplink data transmission, time slots are allocated to the MN in a dedicated fashion. Also, even though it does not request resources, time slots are periodically allocated to the MN by polling, to thereby reduce a data transmission delay. That is, resources are allocated beforehand, just in case of uplink data transmission. However, data transmission is not likely to take place in the polling-based allocated resources because the MN did not request them. These time slots allocated for uplink data transmission having a low probability of occurrence can be defined as reserved time slots for status notification of an initially accessing MN. The reserved time slots are at once time slots that have been allocated to a specific MN for uplink data transmission and time slots that are available for notifying the status of an initially accessing MN.

Figure 6:
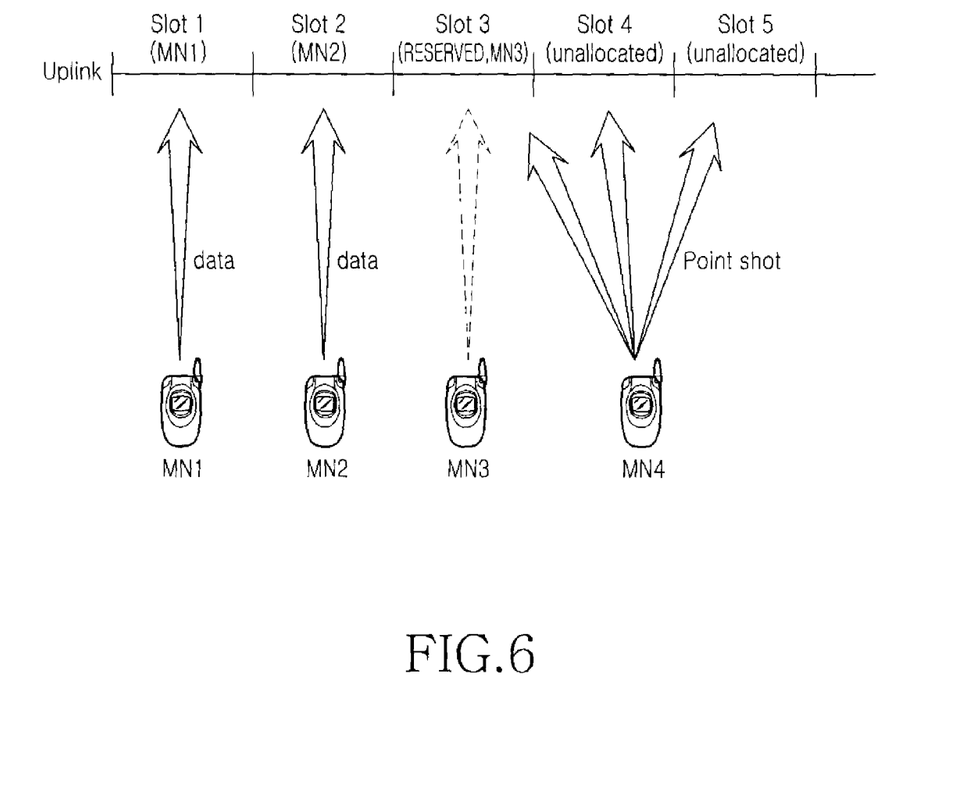
FIG. 6 illustrates a method for transmitting a status information signal in a reserved slot from an MN in the WLAN system using VLC according to an exemplary embodiment of the present invention.

FIG. 6 illustrates a method for transmitting a status information signal in a reserved slot from an NM in the WLAN system using VLC according to an exemplary embodiment of the present invention.

Referring to FIG. 6, first and second time slots (Slot 1 and Slot 2) are allocated to first and second MNs (MN1 and MN2), for uplink data transmission, fourth and fifth time slots (Slot 4 and Slot 5) are unallocated, and a third time slot (Slot 3) is allocated as a reserved slot. Slot 3 can be used for a third MN (MN3) to transmit uplink data or for an initially accessing MN to transmit a visible light signal for status notification. If the uplink data transmission and the visible light transmission occur at the same time, the resulting collision leads to failed uplink data transmission. Yet, considering the initial accesses of MNs do not occur frequently and uplink data is transmitted with a low probability in reserved time slots, the collision also has a low probability of occurrence.

Because the AP is not aware when an MN initially requests access to the AP, the AP retains a predetermined number of time slots per frame as unallocated or reserved, for notification of the status of the MN. It is effective to allocate the reserved slots to an MN which is not likely to cause collision or with which collision does not matter much. Therefore, reserved slots can be allocated to MNs in the order of earlier resource requesting time or in a descending order of priority. As described above, the AP secures sufficient time slots in an appropriate scheduling scheme so that MNs can notify their statuses with minimal collisions.

When an MN enters into the service area of the AP, the MN attempts an initial access to the AP. Until the MN succeeds in accessing the AP, the attempt continues. Therefore, once the MN attempts the initial access, it is kept in an initial access attempt state for a predetermined time. Detecting the initial access attempt of the MN, the AP terminates uplink data transmission in a reserved time slot when the time slot is occupied for the uplink data transmission, so as to prevent collision between MNs.

The above-described method according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As is apparent from the above description, the present invention advantageously allows an MN to notify an AP of its status during an initial access to the AP in a WLAN system using VLC. Also, the present invention ensures efficient uplink data transmissions of other MNs. Therefore, the present invention increases overall system throughput and facilitates management.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for notifying status of a Mobile Node (MN) in a Wireless Local Area Network (WLAN) system using VLC, comprising:
    allocating a first predetermined number of time slots in a frame of time slots as unallocated slots, said unallocated slots assigned with providing status notification of an initially accessing MN and allocating a second predetermined number of time slots of said frame as reserved slots, said reserved slot assigned with providing status notification during initial access of an MN and uplink data transmission of other specific MNs, respectively, by an Access Point (AP) without interfering with uplink data transmission from other MNs in the WLAN; and
    transmitting a visible light signal representing status information of the MN in one of an unallocated slot and a reserved slot by the MN when the MN initially accesses the AP;
    wherein the visible light signal comprises a visible light carrier representing status information of the MN that is flickered to repeat a visible "on" period and a visible "off" period, a plurality of signal patterns are represented by controlling an interval between said visible "on" period and said visible "off" period and said visible light signal representing status information of said MN represents said status information of the MN by individually corresponding status information of the MN to said plurality of signal patterns; and
    terminating uplink data transmission in the reserved slot by the AP when the MN attempts an initial access to the AP and is to transmit the visible signal in a reserved slot.

2. The method of claim 1, wherein the said "on" period is composed of a plurality of on and off signals repeated too fast to be detected visibly and said "on" signals outnumbers said "off" signals.

3. The method of claim 1, wherein the status information is one of: no reception from the AP, acquisition of downlink synchronization to the AP, awaiting a response for an access request to the AP, failure regarding an access request to the AP, and successful access to the AP.

4. The method of claim 1, wherein the reserved slots are allocated to MNs with a low probability of uplink data transmission.

5. The method of claim 1, wherein said signal pattern determines a duration of said "on" time.

6. The method of claim 1, wherein the visible light signal repeats a visible "on" period and a visible "off" period, wherein within said "on" period includes said status information represented as a plurality of light "on" signals and light "off" signals repeated too fast to be detected visibly and a number of said "on" signals is greater than a number of said "off" signals.

7. The apparatus of claim 1, wherein the visible light signal repeats a visible "on" period and a visible "off" period, wherein within said "on" period includes said status information represented as a plurality of light "on" signals and light "off" signals repeated too fast to be detected visibly and a number of said "on" signals is greater than a number of said "off" signals.

8. A system for notifying status of a Mobile Node (MN) in a Wireless Local Area Network (WLAN) system using VLC, comprising:
    an Access Point (AP) allocating a first predetermined number of time slots of a frame of time slots as unallocated slots, for status notification of an initially accessing MN and allocating a second predetermined number of time slots of said frame of time slots as reserved slots, said unallocated slots for status notification of an initially accessing MN and said reserved slots for status notification during initial access of an MN and uplink data transmission of other specific MNs, respectively, without interfering with uplink data transmission from said other specific MNs in the WLAN; and
    an MN for transmitting a visible light signal representing status information about the MN in one of an unallocated slot and a reserved slot, when the MN initially accesses the AP;
    wherein the visible light signal comprises a visible light carrier representing status information of the MN that is flickered to repeat a visible "on" period and a visible "off" period, a plurality of signal patterns are represented by controlling an interval between said visible "on" period and said visible "off" period and said visible light signal representing status information of said MN represents said status information of the MN by individually corresponding status information of the MN to said plurality of signal patterns;
    wherein if the MN attempts an initial access to the AP and is to transmit the visible signal in a reserved slot, the AP terminates uplink data transmission in the reserved slots if the MN attempts an initial access to the AP and is to transmit the visible signal in a reserved slot.

9. The system of claim 8, wherein the said "on" period is composed of a plurality of on and off signals repeated too fast to be detected visibly and said "on" signals outnumbers said "off" signals.

10. The system of claim 8, wherein the status being one of: no reception from the AP, acquisition of downlink synchronization to the AP, awaiting a response for an access request to the AP, failure regarding an access request to the AP, and successful access to the AP.

11. The system of claim 8, wherein the reserved slots are allocated to MNs with a low probability of uplink data transmission.

12. The system of claim 8, wherein said signal pattern determines a duration of said "on" time.

13. An access point comprising:
a processor in communication with a memory, the memory including code which when accessed by the processor causes the processor to:
establishing a transmission frame including a plurality of time slots;
allocate a first predetermined number of time slots in said frame as unallocated time slots and a remaining number of time slots as reserved slots, said unallocated time slots assigned to providing status information of each of a plurality of mobile nodes (MNs), and said reserved slots assigned to providing a status information of an MN initially communicating with the access point and uplink data transmission of other MNs of the plurality of MNs, respectively, without interfering with uplink data transmission from other MNs in the WLAN;
receiving a visible light signal comprising a visible light carrier representing status information of at least one the plurality of mobile nodes that is flickered to repeat a visible representation as a period of "on" times and "off" times, representing said status information regarding a mobile node in one of an unallocated slot and a reserved slot, when the mobile node initially accesses the AP, wherein said "on" period is longer than said "off" period; and
terminating an uplink data transmission in one of said reserved slots when a mobile node attempts an initial access to the AP utilizing said reserved slot.

14. The access point of claim 13, wherein the reserved slots are allocated to mobile nodes with a low probability of uplink data transmission.

15. The access point of claim 13, wherein the status information being one of: no reception from the AP, acquisition of downlink synchronization to the AP, awaiting a response for an access request to the AP, failure regarding an access request to the AP, and successful access to the AP.

16. The access point of claim 13, wherein the status of said mobile node is mapped to one of a plurality of signal patterns.

17. The access point of claim 16, wherein the said "on" period is such that on and off repeatedly flickers too fast to be detected visibly and "on" signals outnumbers "off" signals.

18. The access point of claim 16, wherein said signal pattern determines a duration of said "on" time.

* * * * *